United States Patent
Thiagarajan et al.

(10) Patent No.: US 8,291,926 B2
(45) Date of Patent: Oct. 23, 2012

(54) REDUCTANT DOSING SYSTEM HAVING ANTI-AERATION DEVICE

(75) Inventors: Sairam P. Thiagarajan, Dunlap, IL (US); Stephan D. Roozenboom, Washington, IL (US); Raymond B. Gerges, Peoria, IL (US); Jinhui Sun, Bloomington, IL (US); Shashank Mupparapu, Peoria, IL (US); Tetsu O. Velasquez, Washington, IL (US); Yung T. Bui, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 619 days.

(21) Appl. No.: 12/389,861

(22) Filed: Feb. 20, 2009

(65) Prior Publication Data

US 2010/0212290 A1 Aug. 26, 2010

(51) Int. Cl.
*F17D 1/00* (2006.01)
*F16K 51/00* (2006.01)
(52) U.S. Cl. .......... 137/14; 137/240; 137/587; 137/590; 137/513.5
(58) Field of Classification Search .................. 137/587, 137/589, 583, 592, 590, 240, 513.3, 513.5, 137/513.7, 14
See application file for complete search history.

(56) References Cited

U.S. PATENT DOCUMENTS

| | | | |
|---|---|---|---|
| 3,173,408 A * | 3/1965 | Brenneman | 137/240 |
| 5,884,475 A | 3/1999 | Hofmann et al. | |
| 6,041,594 A | 3/2000 | Brenner et al. | |
| 6,063,350 A | 5/2000 | Tarabulski et al. | |
| 6,387,336 B2 | 5/2002 | Marko et al. | |
| 6,491,885 B1 | 12/2002 | Tokunaga et al. | |
| 2005/0252201 A1 | 11/2005 | Lecea et al. | |
| 2007/0180816 A1 | 8/2007 | Masuda et al. | |
| 2007/0186543 A1 | 8/2007 | Bakaj et al. | |
| 2007/0283685 A1 | 12/2007 | Ripper et al. | |
| 2008/0066453 A1 | 3/2008 | Oberski et al. | |
| 2008/0069750 A1 | 3/2008 | Oberski et al. | |
| 2008/0202473 A1 | 8/2008 | Cook et al. | |
| 2010/0122521 A1 | 5/2010 | Sun et al. | |

FOREIGN PATENT DOCUMENTS

WO  2008092500  8/2008

* cited by examiner

*Primary Examiner* — Kevin Lee
(74) *Attorney, Agent, or Firm* — Finnegan, Henderson, Farabow, Garrett & Dunner LLP

(57) ABSTRACT

A reductant dosing system for a machine having an engine and an exhaust system is disclosed. The reductant dosing system has a tank configured to hold a reductant, a dosing arrangement, and a supply passage connecting the tank to the dosing arrangement. The reductant dosing system also has a purging arrangement configured to direct purge fluid to at least one of the dosing arrangement and the supply passage, and a valve configured to allow reductant to pass from the tank to the supply passage and to inhibit purge fluid from entering the tank.

21 Claims, 5 Drawing Sheets

REDUCTANT DOSING SYSTEM HAVING ANTI-AERATION DEVICE

TECHNICAL FIELD

The present disclosure is directed to a reductant dosing system and, more particularly, to a reductant dosing system having an anti-aeration device.

BACKGROUND

Reductant dosing systems are typically used to reduce $NO_x$ emissions in large machines where space and weight considerations are not a concern, such as, for example, in locomotives and stationary power generation applications. The reductant is stored in a tank located on the machine and, as the machine operates and produces exhaust, the reductant is pumped from the tank into the machine's exhaust system. The reductant reacts with exhaust at high temperatures to affect a selective catalytic reduction (SCR) of $NO_x$ within the exhaust.

A known shortcoming of dosing systems relates to the relatively high ambient temperatures at which some reductants freeze (about 12° F.). When the reductant freezes, it expands within the dosing system, causing damage to and/or clogging of intricate components such as injector nozzles. One way to inhibit freezing is to purge the system after use. To purge the dosing system, a purging fluid (typically air) is directed through system passages and components to push remaining reductant out of the system.

U.S. Patent Application Publication No. 2005/0252201 (the '201 publication, now abandoned) by Lecea et al. discloses an exemplary purging process. Specifically, the '201 publication discloses an urea storage tank that is connected to an exhaust system via a pump and a passage. Urea is injected into the exhaust system via an atomizer located on the passage. The '201 publication also discloses a purging system that purges reductant from the passage between the pump and the atomizer using compressed air. After compressed air is introduced to the passage, the mixture of air and reductant flows back into the tank or exits the system through the atomizer.

SUMMARY

In accordance with one aspect, the present disclosure is directed toward a reductant dosing system. The reductant dosing system may include a tank configured to hold reductant, a dosing arrangement, and a supply passage connecting the tank to the dosing arrangement. The reductant dosing system may also include a purge arrangement configured to direct purge fluid to at least one of the dosing arrangement and the supply passage, and a valve configured to allow reductant to pass from the tank to the dosing arrangement via the supply passage and to inhibit purge fluid from entering the tank.

According to another aspect, the present disclosure is directed toward a reductant dosing system. The reductant dosing system may include a tank configured to hold reductant, a dosing arrangement, and a supply passage connecting the tank to the dosing arrangement. The reductant dosing system may also include a purge arrangement configured to direct purge fluid to at least one of the dosing arrangement and the supply passage, a first return passage configured to connect the dosing arrangement to the tank, a chamber located within the tank in fluid communication with the first return passage and having an outlet to the tank, and a vent configured to communicate the chamber with the atmosphere.

According to yet another aspect, the present disclosure is directed toward a method for reducing aeration in a reductant storage tank. The method may include pressurizing reductant, and directing pressurized reductant from the reductant storage tank to a dosing arrangement. The method may further include pressurizing purge fluid, and directing pressurized purge fluid to force reductant back to the reductant storage tank. The method may additionally include inhibiting return of the pressurized purge fluid to a portion of the reductant storage tank that is below a fluid level present in the tank.

DETAILED DESCRIPTION

Figure 1:
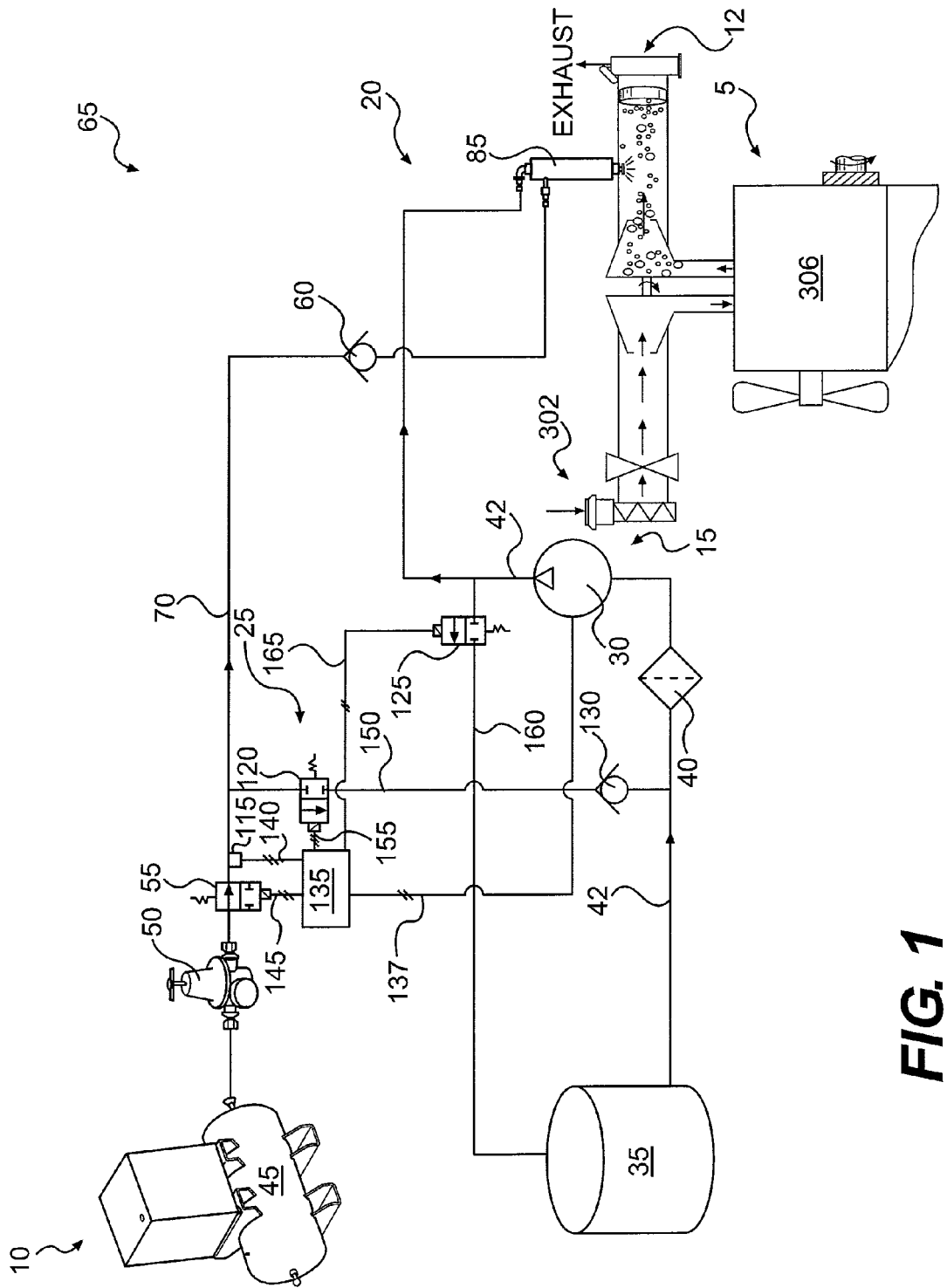
FIG. 1 is a schematic illustration of an exemplary disclosed power system.

FIG. 1 illustrates an exemplary power system 5 having an engine 306 configured to generate an exhaust flow, and a dosing system 10 configured to introduce a reductant into the engine's exhaust flow to affect a chemical reaction that reduces $NO_x$ emissions. In one embodiment, dosing system 10 may be an urea dosing system that injects an urea solution into an exhaust system 12 of engine 306 to affect selective catalytic reduction (SCR). The urea solution may include water ($H_2O$) and urea (($NH_2$)$_2$CO). At temperatures higher than about 250° C., the solution may decompose into ammonia ($NH_3$) that is used to convert $NO_x$ (NO and $NO_2$) in the exhaust flow of engine 306 to elemental nitrogen ($N_2$) and water. Dosing system 10 may include a pumping arrangement 15, a dosing arrangement 20, and a purging arrangement 25. Pumping arrangement 15 may operate to deliver pressurized reductant to dosing arrangement 20 for dosing thereby into exhaust system 12. Purging arrangement 25 may operate to selectively purge pumping arrangement 15 and/or dosing arrangement 20 of residual reductant.

Pumping arrangement 15 may include components that pressurize and direct reductant to dosing arrangement 20. In particular, pumping arrangement 15 may include a pump 30, a reductant source 35, and a filter 40. Pump 30 may generate a flow of reductant within a passage 42 that is fluidly connected to reductant source 35, filter 40, and dosing arrangement 20. Pump 30 may be a metering pump such as, for example, a diaphragm pump, a piston pump, or a rotary pump. Reductant source 35 may be a low-pressure tank for storing reductant. Filter 40 may be a device configured to remove ice crystals and/or debris from a flow of reductant. As pump 30 draws reductant from reductant source 35 and urges the reductant toward dosing arrangement 20, via passage 42, a portion of the reductant may freeze or already be frozen. This frozen reductant may be collected upstream of pump 30 at filter 40.

Dosing arrangement 20 may include components that inject reductant into exhaust system 12 of engine 306. Specifically, dosing arrangement 20 may include a pressure source 45, a pressure regulator 50, a control valve 55, a check valve 60, and a dispensing device 85 fluidly inter-connected via a passage 70. Pressure source 45 may include a pump configured to pressurize a purge fluid, for example, air, and/or a vessel configured to house the pressurized fluid. Pressure source 45 may direct the pressurized fluid toward dispensing device 85 via a passage 70.

Pressure regulator 50 may mechanically maintain a pressure within passage 70 appropriate for reductant dosing by dispensing device 85. Control valve 55 may be any suitable valve such as, for example, a solenoid-actuated and spring-biased control valve that is movable between an open position and a closed position. Control valve 55 may selectively allow fluid flow from pressure source 45 through passage 70 to dispensing device 85 when in the open position, and selectively inhibit flow through passage 70 when in the closed position. Check valve 60 may help ensure a unidirectional flow of reductant through passage 70. Check valve 60 may be any suitable valve such as, for example, a ball check valve. Dispensing device 85 may dispense reductant into exhaust system 12. The reductant dispensed by dispensing device 85 may facilitate a chemical reaction that reduces $NO_x$ emissions.

Purging arrangement 25 may be controlled to selectively purge reductant from components of dosing system 10. Purging arrangement 25 may include a sensor 115, a control valve 120, a control valve 125, a check valve 130, and a controller 135 in communication with sensor 115, and control valves 55, 120, and 125. Controller 135 may be in further communication with pump 30 via an electrical line 137. Controller 135 may also be connected to other components of dosing system 10, for example, to a temperature sensor in thermal contact with exhaust system 12 of engine 306, if desired. In response to inputs from sensor 115 and/or the temperature sensor, controller 135 may selectively affect operation of pump 30, and control valves 55, 120, and 125. Controller 135 may be any type of programmable logic controller known in the art for automating machine processes such as, for example, an engine control unit (ECU).

Sensor 115 may be disposed within passage 70 and embody any suitable sensor for measuring a pressure of fluid therein. Sensor 115 may be electrically connected to controller 135 via an electrical line 140 to provide values indicative of the pressure of passage 70 to controller 135 as input. When sensor 115 reports pressure values that are unsuitable for operation of dosing system 10, controller 135 may cause, via an electrical line 145, control valve 55 to move from the open position toward the closed position, thereby inhibiting fluid flow through passage 70.

Control valve 120 and check valve 130 may be fluidly disposed within a passage 150 that connects passage 70 to passage 42. Control valve 120 may be similar to control valve 55 and may selectively allow and inhibit pressurized air flow through passage 150. Operation of control valve 120 may be regulated by controller 135, via an electrical line 155. Check valve 130 may be similar to check valve 60 and help to ensure a unidirectional flow of purge fluid through passage 150, from pressure source 45 toward an inlet of pump 30.

Control valve 125 may be similar to control valves 55 and 120 and may selectively allow and inhibit return flow of purge fluid and reductant through a passage 160, from dispensing device 85 to reductant source 35. Operation of control valve 125 may be regulated by controller 135, via electrical line 165. Passage 160 may, in one embodiment, be sized larger than passage 42, so as to require less pressure for generating flow.

Figure 2:
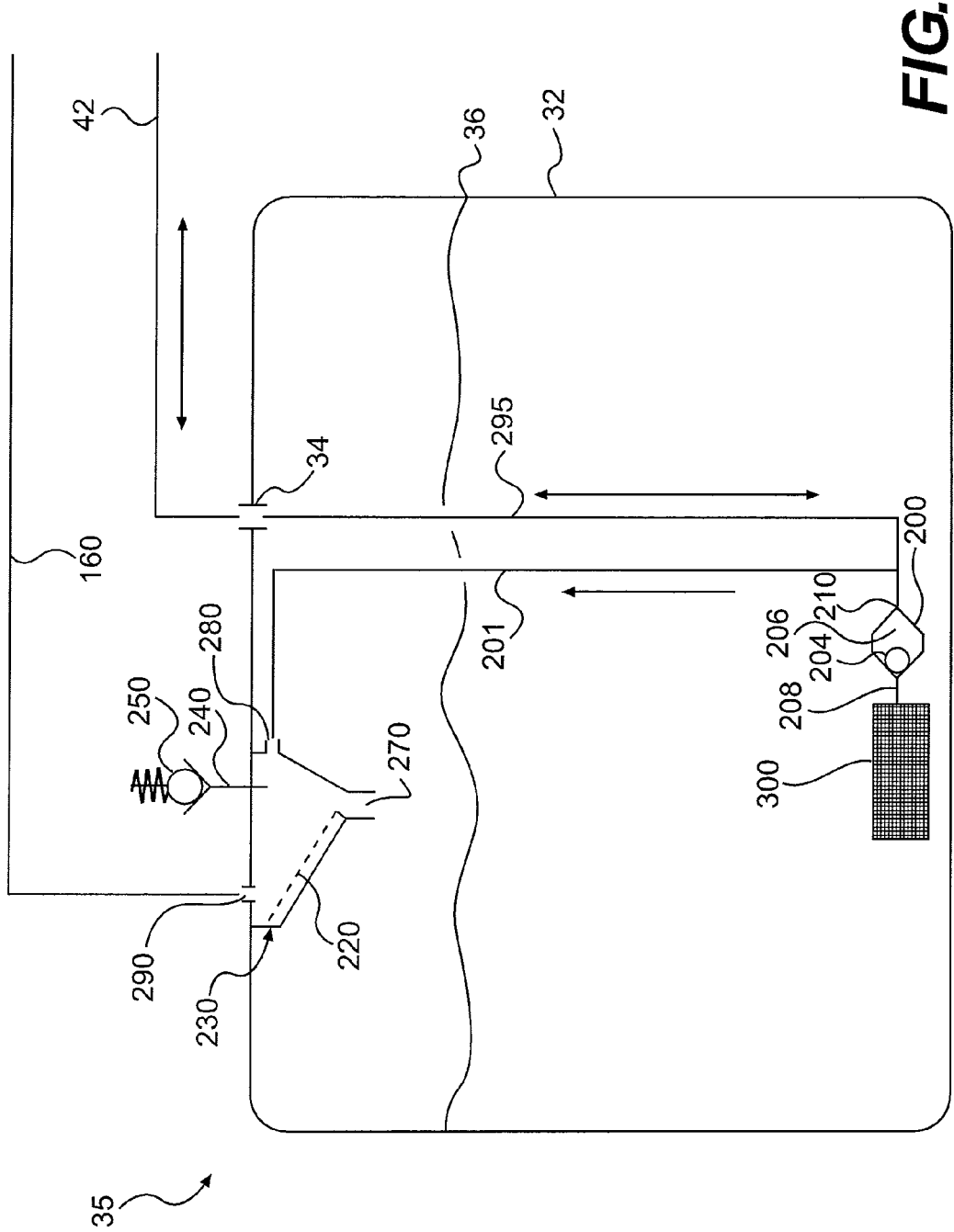
FIG. 2 is a diagrammatic illustration of a reductant source that may be used with the power system of FIG. 1.

As illustrated in FIG. 2, reductant source 35 may generally embody a tank 32 having an inlet 290 and an outlet 34, and being configured to hold reductant. In one example, both inlet 290 and outlet 34 may be located at an upper portion of tank 32 (i.e., a portion above a fluid level 36 within tank 32). Inlet 290 may be configured to communicate passage 160 with the upper portion of tank 32, to allow a mixture of purge fluid and reductant, which may be returned to reductant source 35 during a purging event, to enter tank 32. Outlet 34 may be configured to communicate passage 42 with a valve 200 located within a lower portion of tank 32 (i.e., a portion below fluid level 36 within tank 32) via a passage 295. In one embodiment, a filter or a strainer element 300, may be associated with an end of passage 295 located within the lower portion of tank 32. Outlet 34 may allow reductant to be drawn from tank 32 through strainer element 300 by pump 30 during a dosing event, and allow reductant and purge fluid to return to tank 32 during a purge event.

During a purge event, a mixture of compressed purge fluid and reductant may collect in the upper portion of tank 32. If unaccounted for, this mixture could increase an overall pressure within upper portion of tank 32, above a desired level. Dosing system 10 may help prevent the pressure in the tank 32 from reaching a limit by including a vent outlet 240 configured to release pressurized gases from tank 32 to the atmosphere. Vent outlet 240 may be located at the upper portion, for example on an upper surface of tank 32, and be closed off by a spring-loaded vent cap 250. With this configuration, when the pressure within tank 32 reaches a pre-determined level, spring-loaded vent cap 250 may be moved against the bias of a spring to release pressurized gases to the atmosphere. Alternatively, similar vent outlet arrangements could be manually released, released based on input from a timer, or released with the use of sensors, controllers, and/or electronics, if desired.

To help reduce an amount of gaseous reductant released to the atmosphere during opening of spring-loaded vent cap 250, reductant source 35 may include a generally enclosed chamber 230 located at inlet 290 above the fluid level 36 in tank 32 and in fluid communication with vent outlet 240. As described above, a mixture of purge fluid and residual reductant may enter tank 32 and chamber 230 via inlet 290 during a purging event. As this mixture enters chamber 230, liquid reductant may separate from the mixture and be drawn by gravity to exit chamber 230 via an outlet 270, while gases (i.e., purge fluid and/or gaseous reductant) separating from the mixture may be allowed to exit chamber 230 via vent outlet 240. To promote the flow of liquid reductant from chamber 230 through outlet 270, chamber 230 may include one or more inclined walls positioned under inlet 290 to direct liquid reductant toward outlet 270.

In some situations, it may be possible for the returning purge fluid/reductant mixture to enter chamber 230 with such velocity and/or force that an undesired amount of the mixture is deflected off of the inclined walls toward vent outlet 240 where it can exit tanks 32 to the atmosphere. To inhibit this undesired discharge of reductant, a splash reducing element 220 may be located to slow the flow of reductant entering chamber 230 from inlet 290. Splash reducing element 220 may be generally positioned on the inclined wall(s) of chamber 230, under inlet 290. Splash reducing element 220 may include a mesh-like or porous surface fabricated from materials consisting of plastic, PVC, aluminum, steel, and combinations thereof.

During a purge event, residual reductant and purge fluid may also be returned to tank 32 via passages 42 and 295. If allowed to pass directly into tank 32 at a location submerged below the fluid level 36 in tank 32, any purge fluid (air) entering tank 32 could cause bubbling within tank 32, which could result in degradation of the reductant in tank 32. Valve 200, in association with a return passage 201, may inhibit the return of purge fluid to the bottom portion of tank 32. Return passage 201 may branch from passage 295 at valve 200 and extend to the upper portion of tank 32. In the illustrated embodiment, return passage 201 may extend into chamber 230 via inlet 280.

Figure 3:
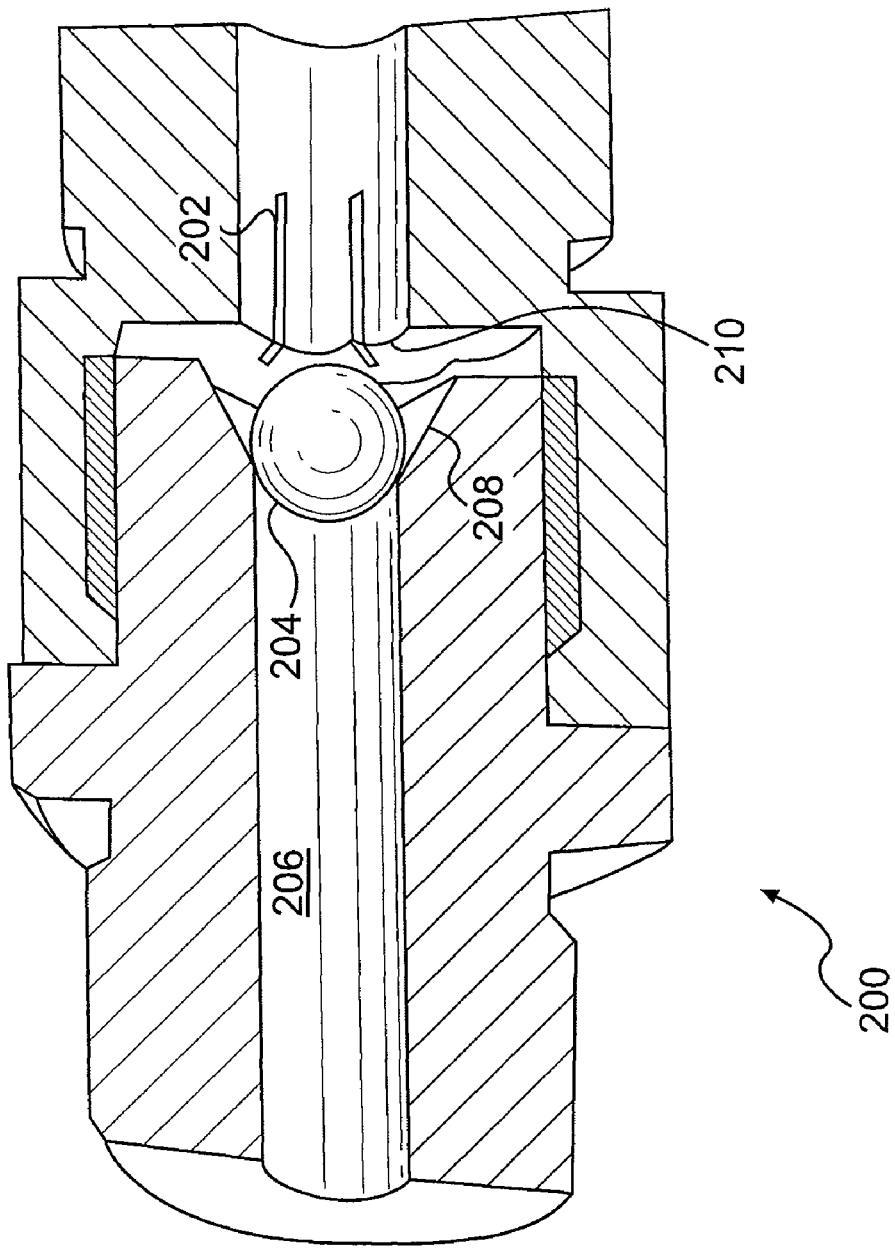
FIG. 3 is a cross-section view of a valve that may be used with the reductant source of FIG. 2.

As shown in FIGS. 2 and 3, valve 200 may generally embody a resolver having a body 206 and a valve element 204 disposed within body 209 and movable between two spaced apart end-positions. Specifically, valve element 204 may be movable from a first position at which valve element 204 engages a first seat 208 to inhibit fluid flow from passage 295 through valve 200 during a purge event, toward a second position at which fluid may pass from tank 32 through valve 200 to passages 295 and 42 during a dosing event. When valve element 204 is in the first position, fluid (i.e., reductant and purge air) returning to tank 32 via passage 42 may still enter tank 32, but only directly to the upper portion thereof, from passage 295 to return passage 201 and into chamber 230. In this manner, substantially no purge fluid may directly enter the bottom portion of tank 32 via valve 200.

As shown in the example of FIG. 3, valve element 204 may embody a ball element, although other configurations, for example a poppet or spool element, may be possible. As a ball element, first seat 208 may generally embody a female conical seat configured to receive valve element 204 in the first position. When in the second position described above, valve element 204 may engage a second, non-sealing seat 210 having associated bypass grooves 202. Bypass grooves 202 may be configured such that, even though valve element 204 may be against second seat 210, reductant may still flow from tank 32 to passages 295 and 42 during a dosing event by way of bypass grooves 202.

Figure 4:
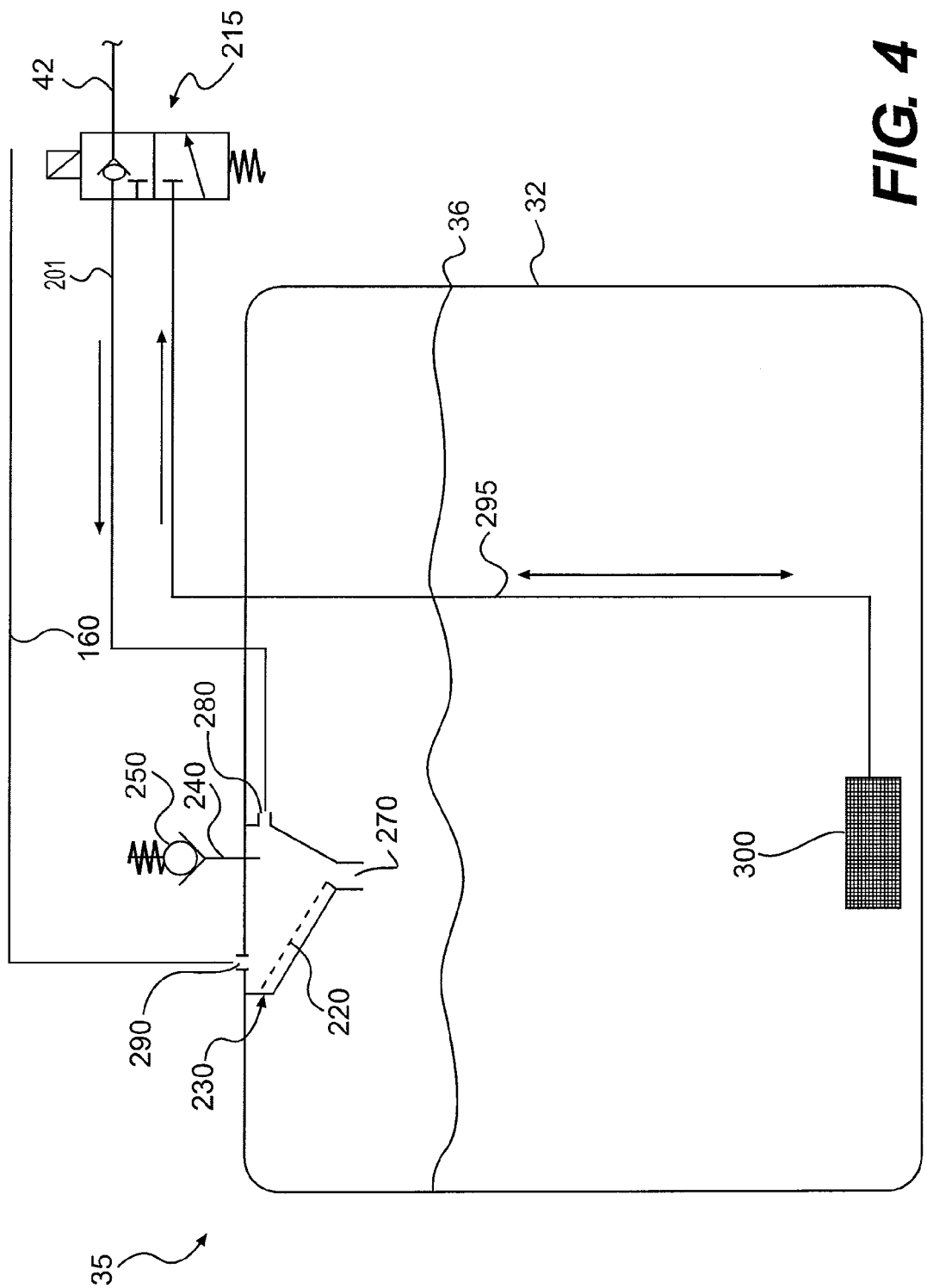
FIG. 4 is a diagrammatic illustration of an alternative reductant source that may be used with the power system of FIG. 1.

FIG. 4 illustrates an alternative embodiment of reductant source 35. In this embodiment, a solenoid valve 215 may replace valve 200. Solenoid valve 215 may generally have a first state at which reductant may flow from the lower portion of tank 32 through passages 295 and 42 during a dosing event, and a second state at which reductant and purge fluid returning to tank 32 via passage 160 may directly enter chamber 230 via inlet 280 during a purging event. It is envisioned that solenoid valve 215 may be programmed to automatically shift between the first and second states or be adjusted manually, if desired.

Figure 5:
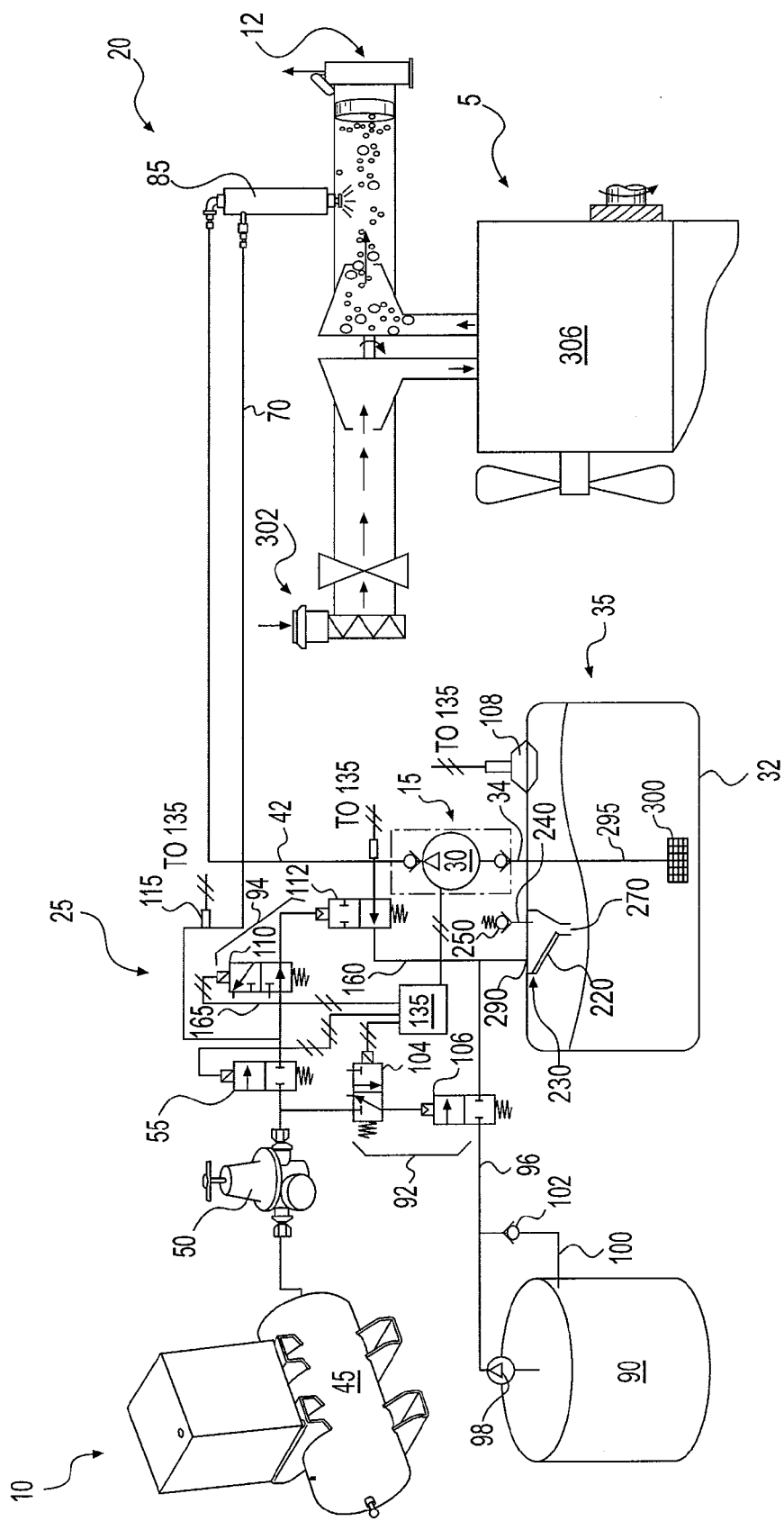
FIG. 5 is a schematic illustration of another exemplary disclosed power system.

FIG. 5 illustrates an alternative embodiment of dosing system 10 intended primarily for stationary applications, for example for stationary electric power generation applications. Similar to dosing system 10 of FIG. 1, dosing system 10 of FIG. 5 may include pumping arrangement 15, dosing arrangement 20, purging arrangement 25, and pumping arrangement 25. However, in contrast to the embodiment of FIG. 1, the purging arrangement 25 of FIG. 5 may include a different configuration of valving to facilitate the use of a remote tank 90. Specifically, in addition to control valve 55 described above, purging arrangement 25 may include a replenish control valve 92 and a dosing control valve 94. Control valves 120 and 125 may be omitted from the purging arrangement 25 of FIG. 5. Replenish control valve 92 may be located to selectively control filling of tank 32 with reductant from remote tank 90 by way of a passage 96. Dosing control valve 94 may be located to selectively control fluid flow through passage 160, thereby controlling a pressure buildup within passage 42 and, subsequently, the initiation of a purge event.

Remote tank 90 may be fluidly connected to tank 32 by way of passage 96 to replenish tank 32 with reductant. In most applications, remote tank 90 may have a larger capacity than tank 32, and even be simultaneously connected to multiple tanks 32 of different dosing systems 10, if desired. In one embodiment, a pressure source, for example a low-pressure transfer pump 98 may be associated with remote tank 90 to pressurize the reductant and thereby create a flow of reductant from remote tank 90 to tank 32. It is contemplated that pump 98 may be continuously operable, or only operable in response to a fluid level within tank 32. Alternatively or additionally, the flow of reductant may be facilitated by gravity (i.e., remote tank 90 may be located gravitationally higher than tank 32 such that gravity causes or enhances the reductant flow to tank 32), if desired. In some situations, a bypass line 100 having a valve, for example a check valve 102, disposed therein may be connected between passage 96 and remote tank 90 so that reductant pressurized by pump 98 may return to remote tank 90, when tank 32 does not require replenishing.

Replenish control valve 92 may embody a solenoid activated-pilot operated control valve having a first valve element 104 fluidly connected to a second valve element 106. First valve element 104 may be solenoid activated to move against a spring bias between a first position, at which pressurized air (or another fluid) from pressure source 45 is directed to move second valve element 106, and a second position, at which the pressurized air is released from second valve element 106. When pressurized air is directed to second valve element 106, second valve element 106 may move to a reductant-passing position, at which reductant pressurized by pump 98 may be directed to replenish tank 32. When the pressurized air is released from second valve element 106, second valve element 106 may be spring-biased toward a reductant-blocking position. In one example, the activation of first element 104, and subsequently the operation of second valve element 106, may be triggered by controller 135 in response to a signal from a fluid level sensor 108 associated with tank 32.

Dosing control valve 94, similar to replenish control valve 92, may embody a solenoid activated-pilot operated control valve having a first valve element 110 fluidly connected to a second valve element 112. First valve element 110 may be solenoid activated to move against a spring bias between a first position, at which pressurized air (or another fluid) from pressure source 45 is directed to move second valve element 112, and a second position, at which the pressurized air is released from second valve element 112. When pressurized air is directed to second valve element 112, second valve element 112 may move to a reductant bypassing position, at which reductant pressurized by pump 30 may be directed back to tank 32 instead of to dispensing device 85. By directing the reductant back to tank 32, pressure may not be allowed to build within passage 42, thereby inhibiting injection by dispensing device 85. When the pressurized air is released from second valve element 112, second valve element 112 may be spring-biased toward a reductant-blocking position. When in the reductant-blocking position, the pressure of reductant moved by pump 30 may build within passage 42 and thereby facilitate injection by dispensing device 85.

INDUSTRIAL APPLICABILITY

The disclosed reductant dosing system may be used in any power system application where freezing of the reductant and clogging of the system are an issue. The disclosed reductant dosing system may reduce the likelihood of freezing and/or clogging by providing purging capabilities. The disclosed reductant dosing system may also significantly reduce bubbling from occurring within the reductant of an associated tank, and the resulting release of gaseous reductant to the atmosphere. Operation of dosing system 10 will now be described.

With regard to the embodiment of FIG. 1, reductant dosing may be initiated when temperatures within exhaust system 12 exceed a threshold temperature, for example about 250° C., to implement selective catalytic reduction. When the exhaust temperatures exceed the threshold temperature, controller 135 may move control valve 55 to its flow-passing position and simultaneously cause pump 30 to pressurize reductant such that air and reductant flow toward dispensing device 85 via passages 70 and 42, respectively. At this time, control valves 120 and 125 may be maintained in or moved to positions blocking flow through passages 150 and 160. Under these conditions, the flows of pressurized air and reductant may be sprayed or otherwise injected by dispensing device 85 into exhaust system 12.

As engine 306 produces exhaust, the reductant directed from tank 32 into exhaust system 12 via dispensing device 85 may react with $NO_x$ contained within the exhaust at high temperatures, affecting a selective catalytic reduction (SCR) of the $NO_x$. Dosing system 10 may be used in this manner to reduce $NO_x$ emissions in large engines such as, for example, in engines used for locomotive applications. Dosing may be stopped and purging may be initiated when a temperature within exhaust system 12 falls below the threshold temperature. Once purging begins, controller 135 may prevent engine 306 from being turned off until the purging process is complete. Alternatively, engine 306 may be fully shut down, and thereafter the purging process may be initiated, if desired.

Purging may be initiated to inhibit damage and/or clogging of dosing components due to freezing, or the formation of polymers as exhaust system 12 cools. The purging process may be initiated by controller 135 moving control valves 120 and 125 to their flow-passing positions, and by inhibiting operation of pump 30. When control valve 120 is in its flow-passing position, pressurized purge fluid from pressure source 45 may be directed through passages 150 and 42 to reductant source 35. When control valve 125 is also moved to its flow-passing position, the flow of pressurized purge fluid directed through control valve 120 and passages 150 and 42 may also simultaneously be directed through pump 30 and then back to reductant source 35 via control valve 125 and passage 160, and/or through pump 30 and then through dispensing device 85 into exhaust system 12 to push reductant from these components. During the purging process, pressurized purge fluid may enter dispensing device 85 via passage 70 and be redirected within dispensing device 85 along with residual reductant back through passage 42, control valve 125, and passage 160 to reductant source 35. It is contemplated that control valves 120 and 125 may be simultaneously moved to their flow-passing positions during the purging process, or selectively moved to the flow-passing positions at different times, if desired.

With respect to FIG. 2, the purge fluid and reductant returning to reductant source 35 via passage 160, may enter chamber 230 by way of outlet 290. From there, the returning fluids may interact with splash-reducing element 220 and empty into tank 32 through chamber outlet 270. Splash-reducing element 220 may help reduce the likelihood of returning reductant being undesirably deflected toward vent 240 and discharged to the environment. The purge fluid and reductant returning to reductant source 35 via passage 42, may enter tank 32 via inlet 34, and flow toward valve 200 via passage 295. During the purging process, valve element 204 may be shifted by the pressure of the returning fluids against first seat 208 to block the fluids from discharging below the fluid level 36 within tank 32, and instead divert the fluids through return passage 201 to discharge above the fluid level and within chamber 230. During an ensuing dosing event, valve element 204 may be returned by fluid pressure to its flow-passing position against second seat 210, at which reductant drawn through strainer element 300 by the operation of pump 30 may pass through valve element 204 via bypass grooves 202 (referring to FIG. 3) and enter passage 42 via passage 295.

With respect to the embodiment of FIG. 4, the purge air and reductant returning to reductant source 35 via passage 42 during the purging process, may flow directly to chamber 230 via solenoid valve 215 and return passage 201. As described above, solenoid valve 215 may be moved to its second position during the purge process, and then returned by way of a spring bias to its first position during an ensuing dosing event. When in the first position, fluid may be drawn through strainer element 300, passage 295, solenoid valve 215, and passage 42 by pump 30.

With regard to the embodiment of FIG. 5, reductant dosing may be initiated under conditions similar to those described above (i.e., when temperatures within exhaust system 12 exceed about 250° C.) to implement selective catalytic reduction. Specifically, when the temperatures of exhaust system 12 exceed the threshold temperature, controller 135 may move control valve 55 to its flow-passing position and simultaneously energize first valve element 110 of dosing control valve 94 to cause second valve element 112 to move to its second or flow-blocking position. When both of control valve 55 and second valve element 112 are in their flow-blocking positions, pressurized air and reductant may flow to dispensing device 85 via passages 70 and 42 for injection by dispensing device 85. During dosing events, when the level of reductant within reductant source 35 falls below a predetermined level, as monitored by fluid level sensor 108, controller 135 may energize first valve element 104 of replenish control valve 92 to move second valve element 106 to its flow-passing position, at which makeup reductant from remote tank 90 flows into reductant source 35.

Dosing may be stopped and purging may be initiated when temperatures within exhaust system 12 fall below the threshold temperature. To initiate purging of dosing system 10 shown in FIG. 5, controller 135 may de-energize first valve element 110 of dosing control valve 94 to allow second valve element 112 to be spring-biased back to its first or flow-passing position. At this time, control valve 55 may still be in or moved to its flow-passing position, such that pressurized air from pressure source 45 may flow into dispensing device 85 via passage 70, and along with residual reductant flow back through passage 42, second valve element 112, and passage 160 into chamber 230 of tank 32. In the embodiment of FIG. 5, purge fluid may not pass through pump 30. In one example, second valve element 106 of replenish control valve 92 may be maintained in its flow-blocking position during the purge process such that purge fluid also does not pass to remote tank 90.

It will be apparent to those skilled in the art that various modifications and variations can be made to the disclosed dosing system. Other embodiments will be apparent to those skilled in the art from consideration of the specification and practice of the disclosed dosing system. It is intended that the specification and examples be considered as exemplary only, with a true scope being indicated by the following claims and their equivalents.

What is claimed is:

1. A reductant dosing system, comprising:
   a tank configured to hold reductant;
   a dosing arrangement;

a supply passage connecting the tank to the dosing arrangement;

a purging arrangement configured to direct purge fluid to at least one of the dosing arrangement and the supply passage; and a valve configured to allow reductant to pass from the tank to the dosing arrangement via the supply passage and to inhibit purge fluid from entering a portion of the tank below a fluid level.

2. The reductant dosing system of claim 1, wherein the valve includes two opposing seats and a valve element moveable between a first position against a first of the two opposing seats to inhibit purge fluid from entering the tank, and a second position against a second of the two opposing seats to allow reductant from the tank to the supply passage.

3. The reductant dosing system of claim 2, wherein the valve further includes grooves located at the second of the two opposing seats, wherein the grooves are configured to allow reductant to bypass the valve element when the valve element is in the second position.

4. The reductant dosing system of claim 3, wherein the valve is configured to inhibit purge fluid from entering the portion of the tank below the fluid level when the valve is in the first position.

5. The reductant dosing system of claim 4, further including a first return passage connecting the supply passage to a portion of the tank above the fluid level.

6. The reductant dosing system of claim 5, further including:

an inlet located below the fluid level of the tank and fluidly coupled to both the first return passage and the supply passage via the valve; and a strainer element located at the inlet.

7. The reductant dosing system of claim 6, further including:

a vent chamber located above the fluid level of the tank and fluidly coupled to the first return passage; and a second return passage connecting the dosing arrangement to the vent chamber.

8. The reductant dosing system of claim 1, wherein the reductant is an urea solution.

9. The reductant dosing system of claim 1, further including a first passage fluidly connected to the valve and extending into the tank below the fluid level.

10. A reductant dosing system, comprising:

a tank configured to hold reductant;

a dosing arrangement;

a supply passage connecting the tank to the dosing arrangement;

a purging arrangement configured to direct purge fluid to at least one of the dosing arrangement and the supply passage;

a first return passage configured to connect the dosing arrangement to the tank;

a chamber located within the tank in fluid communication with the first return passage and having an outlet to the tank; and a vent configured to communicate the chamber with the atmosphere.

11. The reductant dosing system of claim 10, further including a wall opposed to an outlet of the first return passage and inclined relative to a fluid level within the tank.

12. The reductant dosing system of claim 11, further including a splash-reducing element connected to the wall and configured to slow reductant flow from the first return passage into the chamber.

13. The reductant dosing system of claim 10, further including a second return passage communicating the supply passage with the chamber.

14. The reductant dosing system of claim 13, further including a valve configured to allow reductant to pass from the tank to the dosing arrangement via the supply passage and to direct purge fluid entering the tank through the second return passage to the chamber.

15. The reductant dosing system of claim 10, wherein the reductant is an urea solution.

16. A method for reducing aeration in a reductant storage tank, the method comprising:

pressurizing reductant;

directing pressurized reductant from the reductant storage tank to a dosing arrangement via a supply passage;

pressurizing purge fluid;

directing pressurized purge fluid to force reductant to at least one of the dosing arrangement and the supply passage;

controlling a valve to allow reductant to pass from the reductant storage tank to the dosing arrangement via the supply passage; and controlling the valve to inhibit return of the purge fluid to a portion of the reductant storage tank that is below a level of fluid present in the reductant storage tank.

17. The method of claim 16, further including directing returning purge fluid through a portion of the reductant storage tank below the fluid level to a portion of the reductant storage tank above the fluid level.

18. The method of claim 17, further including directing returning purge fluid to the portion of the reductant storage tank above the fluid level.

19. The method of claim 18, further including venting purge fluid from the reductant storage tank to the atmosphere.

20. The method of claim 18, further including reducing splash from returning purge fluid.

21. A reductant dosing system, comprising:

a tank configured to hold reductant;

a dosing arrangement;

a supply passage connecting the tank to the dosing arrangement;

a purging arrangement configured to direct purge fluid to at least one of the dosing arrangement and the supply passage;

a valve configured to allow reductant to pass from the tank to the dosing arrangement via the supply passage and to inhibit purge fluid from entering below a fluid level of the tank;

a first return passage configured to connect the dosing arrangement above the fluid level of the tank;

a second return passage configured to connect the valve above the fluid level of the tank;

a chamber located within the tank in fluid communication with the first and second return passages and having an outlet to the tank; and a vent configured to communicate the chamber with the atmosphere.

* * * * *